United States Patent
Ferro et al.

(10) Patent No.: US 9,727,853 B2
(45) Date of Patent: *Aug. 8, 2017

(54) PRINTING DYNAMIC IMAGE CONTENT ON RECEIPTS

(71) Applicant: Mobivity, Inc., Chandler, AZ (US)

(72) Inventors: Jay Ferro, Goleta, CA (US); Bradley G. Bennett, Santa Barbara, CA (US); Roberto C. Aguilar, Goleta, CA (US); Nicholas Matthew Bolton, Goleta, CA (US)

(73) Assignee: Mobivity, Inc., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/348,965

(22) Filed: Nov. 10, 2016

(65) Prior Publication Data

US 2017/0061417 A1    Mar. 2, 2017

Related U.S. Application Data

(63) Continuation of application No. 14/833,071, filed on Aug. 22, 2015, now Pat. No. 9,495,671, which is a continuation of application No. 12/714,259, filed on Feb. 26, 2010, now abandoned, which is a continuation-in-part of application No. 11/690,912, filed on Mar. 26, 2007, now abandoned.

(Continued)

(51) Int. Cl.
| | |
|---|---|
| *G06F 17/00* | (2006.01) |
| *G06Q 20/20* | (2012.01) |
| *B42D 15/00* | (2006.01) |
| *G07F 17/42* | (2006.01) |
| *G07G 5/00* | (2006.01) |
| *G06K 15/02* | (2006.01) |
| *G07G 1/00* | (2006.01) |
| *H04N 1/41* | (2006.01) |

(52) U.S. Cl.
CPC ....... *G06Q 20/209* (2013.01); *B42D 15/0053* (2013.01); *G06K 15/1852* (2013.01); *G06K 15/1868* (2013.01); *G07F 17/42* (2013.01); *G07G 1/0009* (2013.01); *G07G 5/00* (2013.01); *H04N 1/41* (2013.01)

(58) Field of Classification Search
CPC .. G06Q 20/209; G07F 17/42; B42D 15/0053; G07G 5/00
USPC .......................................... 235/375, 383, 487
See application file for complete search history.

(56) References Cited

U.S. PATENT DOCUMENTS 7,280,258 B2 * 10/2007 Kitahara ................ G06K 15/02
                                                    347/19
2002/0113120 A1 * 8/2002 Yajima ................ B41J 2/17546
                                                    235/375

(Continued)

*Primary Examiner* — Paultep Savusdiphol
(74) *Attorney, Agent, or Firm* — Clause Eight IPS; Michael Catania

(57) ABSTRACT

A method, apparatus, and computer readable storage medium for printing a receipt. Receipt data may be generated at a point-of-sale terminal. At least one value adding message including a graphical image may be automatically selected and dynamic content for the value adding message may be automatically generated. A receipt may be printed by a point-of-sale printer, the receipt including the receipt data, the graphical image, and the dynamic content, wherein the dynamic content is printed in a window embedded within the graphic image.

2 Claims, 7 Drawing Sheets

Related U.S. Application Data

(60) Provisional application No. 60/767,408, filed on Mar. 26, 2006.

(56) References Cited

U.S. PATENT DOCUMENTS

| | | | | |
|---|---|---|---|---|
| 2003/0074254 A1* | 4/2003 | Iijima | G06Q 20/387 | 705/14.38 |
| 2004/0039633 A1* | 2/2004 | Nicholson | G06Q 30/02 | 705/14.13 |
| 2004/0041022 A1* | 3/2004 | Minowa | G06Q 30/02 | 235/383 |
| 2004/0105126 A1* | 6/2004 | Minowa | B42D 15/00 | 358/1.18 |
| 2004/0112236 A1* | 6/2004 | Yokoyama | B42D 15/00 | 101/483 |
| 2005/0040230 A1* | 2/2005 | Swartz | G06K 17/00 | 235/383 |
| 2005/0173522 A1* | 8/2005 | Turner | G06Q 30/02 | 235/383 |
| 2005/0242178 A1* | 11/2005 | Minowa | G06Q 30/0225 | 235/383 |
| 2005/0275894 A1* | 12/2005 | Minowa | G07F 17/42 | 358/1.18 |
| 2005/0286088 A1* | 12/2005 | Takagi | H04N 1/32229 | 358/3.28 |
| 2006/0055950 A1* | 3/2006 | Sugimoto | B41J 11/008 | 358/1.12 |

* cited by examiner (c) 2010 Nutricate

PRINTING DYNAMIC IMAGE CONTENT ON RECEIPTS

CROSS REFERENCE TO RELATED APPLICATION

The Present Application is a continuation application of U.S. patent application Ser. No. 14/833,071, filed on Aug. 22, 2015, which is a continuation application of U.S. patent application Ser. No. 12/714,259, filed on Feb. 26, 2010, now abandoned, which is a continuation in part application of U.S. patent application Ser. No. 11/690,912 , filed on Mar. 26, 2007, now abandoned, which claims benefit under 35 USC 119(e) of U.S. Provisional Patent Application No. 60/767,408, filed on Mar. 26, 2006, now expired, all of which are hereby incorporated by reference in their entireties.

STATEMENT REGARDING FEDERALLY SPONSORED RESEARCH OR DEVELOPMENT

Not Applicable

BACKGROUND OF THE INVENTION

Field of the Invention

This disclosure relates to point-of-sale (POS) systems and specifically to printing value adding messages with dynamic content on POS receipts.

Description of the Related Art

POS systems commonly print receipts to provide each customer with a record of a purchase or other commercial transaction. Each receipt may include receipt data such as the name and location of the vendor or store; identification, quantity, and price of each item purchased; identification of a total amount paid and a method of payment; and, in some cases, information identifying the customer and/or a sales associate or another vendor employee. POS systems may also print additional information in addition to receipt data on each receipt. The additional information may be intended to add value to the customer's experience. The additional information may include advertisements, coupons, game tokens, invitations, and other information, all of which will be referred to herein as "value adding messages" (VAMs).

Current VAMs are commonly either only text messages or only graphical images. Text messages are typically stored and transmitted as strings of symbols. The possible symbols include alphanumeric characters and special symbols, and may include simple graphics elements such line segments and corners. Each symbol in a string is represented by a code which may be, for example, 8 bits in length. The symbol codes may be, or may be adapted from, the ASCII (American Standard Code for Information Interchange) code. Symbols strings may include control characters and sequences of characters to control printing functions such as starting a new line and selecting a character font. To print a text message, the corresponding symbol string is transmitted to a printer, where each symbol is converted into an array of picture elements or dots for printing. Each symbol code may be converted to 100 or more picture elements.

BRIEF SUMMARY OF THE INVENTION

In this patent, the term "graphical image" includes any printable image that cannot be conveyed or represented as a symbol string. Examples of graphical images include photographs, line drawings, logos, and unusual text (i.e. text where adjacent letters overlap) that cannot be represented as a string of characters. Graphical images are typically organized as two-dimensional arrays of picture elements. Graphical images are stored and transmitted as image data files which contain at least some data for each picture element. Uncompressed image data files, such as bitmap (BMP) data files, include a predetermined number of bits corresponding to each picture element. A simple graphical image without color or gray tones may be stored in an uncompressed image data file with one bit per picture element. A high quality color photographic image may require 24 or more bits per picture element. Image data files may be compressed to reduce the amount of data required to convey a graphical image. Examples of compressed image data file formats include JPG (Joint Photographic Experts Group), EXF (exchangeable image file), TIF (tagged image file), PNG (portable network graphics), and GIF (graphic interchange format).

Text messages may be composed, at least in part, within POS systems. Graphical images may be stored as image data files within a POS terminal or POS printer and are typically printed on the receipt without dynamic content. Within this document, the term "dynamic content" means content that depends, at least in part, upon information that is not known until a transaction occurs and thus cannot be predetermined. The dynamic content may depend, for example, on the items purchased, the customer identity, the customer service representative, and/or the day, time of day, or date of the transaction.

The process of printing to a POS printer may be different from printing to a standard PC-based computer printer. Each printer manufacturer may define a specific protocol for their printers. Most part POS printer manufacturers support a basic level of "Epson emulation" by supporting a subset of the ESC-POS specification created by Epson. Graphical images are printed to the printer either by streaming bit data to the printer, or by referencing a graphical data file previously stored in the printer's non-volatile memory. Graphical images recalled from memory typically have to be printed at the full width of the printer.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

In this description, the term "point of sale system" encompasses point of sale systems, checkout systems, electronic cash registers, and other electronic and/or computing devices used to conduct and document sales, orders, and other commercial transactions. A point of sale system may print a document containing information relating to, or supplemental to, each transaction. The document printed by the POS system may be a receipt, a guest check, an invoice, a voucher, a sales order, a delivery confirmation, a promotion or coupon offering, or other document, all of which will be referred to herein as "receipts". For ease of description, the data to be printed on the document will be referred to herein as "receipt data" regardless of the actual function of the document.

Figure 1B:
FIG. 1B is a view of another exemplary graphical VAM with dynamic content.
Figure 1A:
FIG. 1A is a view of an exemplary graphical value adding message (VAM) with dynamic content.

Referring now to FIG. 1A, an exemplary VAM 102 may include a graphical image 103 and a window 104 containing dynamic content printed within the graphical image 103. In this example, the graphical image 102 is an invitation for a customer to participate in an on-line survey, with a reward of a free food item if the customer participates. The information printed within the dynamic content window 104 may be a code conveying information such as a store location or number, a date, a POS terminal number or cashier number, a receipt number or time of day, and other information to allow the customer's responses to be correlated with a particular store location and/or employee. The extent of the dynamic content window 104 is outlined by a dash-dot rectangle in FIG. 1A, but would not necessarily be outlined on an actual POS receipt.

Referring now to FIG. 1B, another exemplary VAM 105 may also include a graphical image 106 and a dynamic content window 107 (outlined by a dash-dot rectangle) embedded within the graphical image 106. In this example, the graphical image 106 is a coupon for an unspecified food item. The information printed within the dynamic content window 107 specifies the free food item and an expiration date. The free food item may be, for example, selected from the items purchased by the customer, and thus be of known value to the customer. The free food item may be selected from menu items not purchased by the customer to attempt to expand the customer's taste palette and thus encourage larger future purchases. The expiration date may be derived from the date of the purchase, such as one week or ten days or one month from the date of purchase.

Within this description, a dynamic content window is considered to be "embedded within" a graphical image if at least portions of two sides of the dynamic content window touch the graphical image. A dynamic content window may be surrounded on four sides by the graphical image, as shown in FIG. 1A and FIG. 1B. A dynamic content window may be tangential to an edge of a graphical image, may be positioned in a corner of the graphical image, or may extend beyond an edge of the graphical image and still be considered to be "embedded within" the graphical image.

Figure 2:
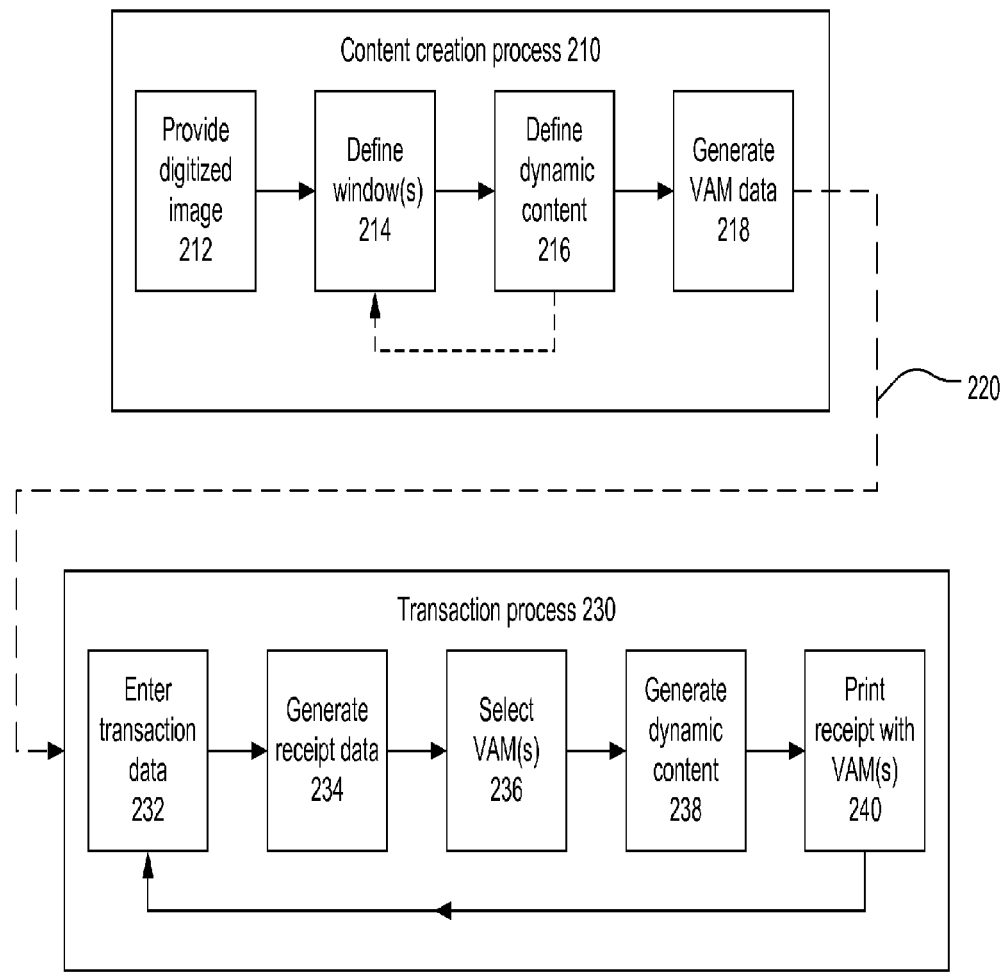
FIG. 2 is a flow chart of a process for printing graphical VAMs with dynamic content.

Referring now to FIG. 2, a process 200 for printing one or more VAMs on a POS receipt may include a content creation process 210 and a transaction process 230. The content creation process 210 may be performed once for each VAM. The content creation process 210 may be performed by a user in conjunction with a content creation software tool operating on an administrator computing device, which may be the POS terminal or may be another computing device such as personal computer, a portable computer, a personal digital assistance, or other computing device. The transaction process 230 may be performed repetitively at a POS terminal for each sale or transaction.

Figure 3:
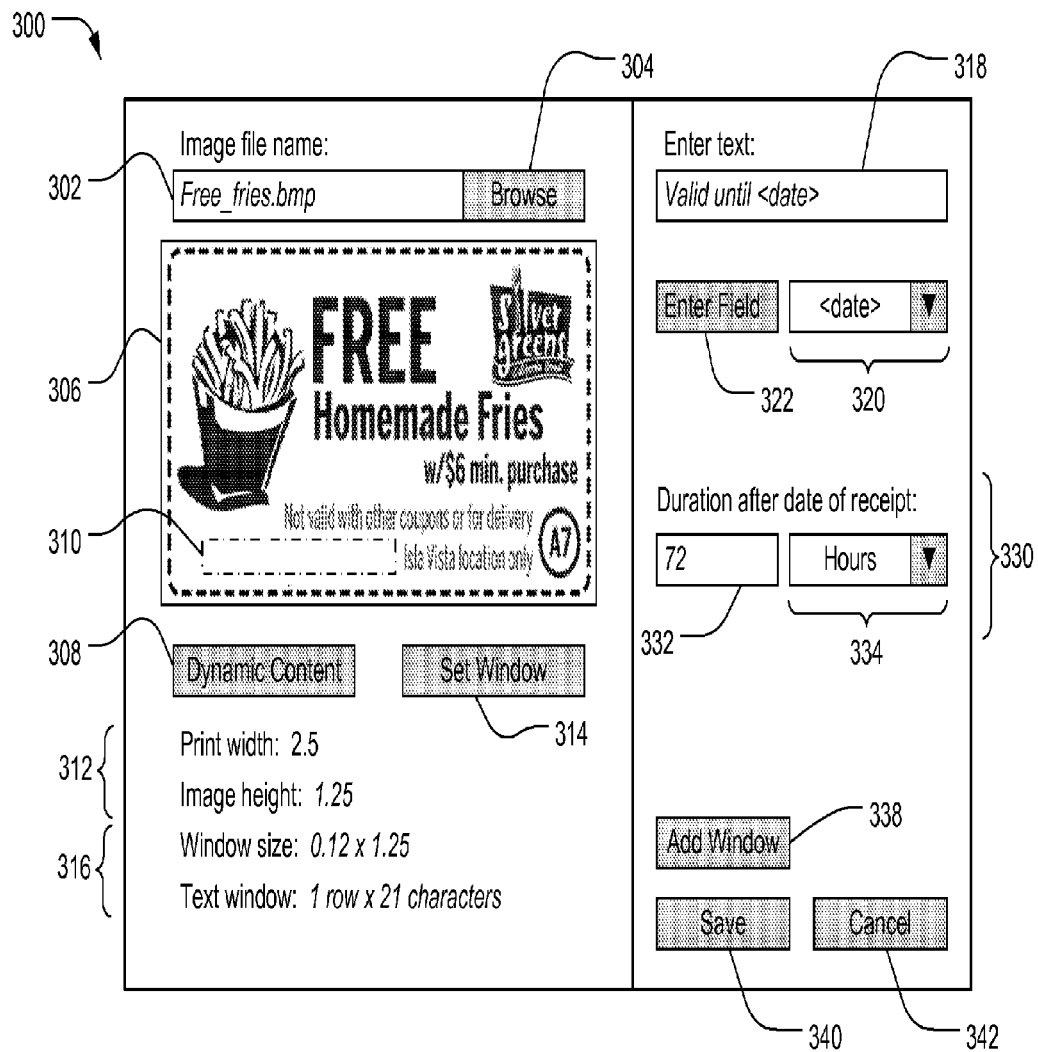
FIG. 3 is a representation of a screen for editing a VAM.

FIG. 3 shows an exemplary graphical user interface (GUI) 300 that may be displayed by the content creation software tool to assist a user to create a VAM using the content creation process 210. The GUI 300 is representative of an unlimited number of possible graphical interfaces for the content creation tool. Throughout the content creation process 210, a user may exercise control of the process via the graphical interface. The user may exercise control via a mouse or other pointing device, a touch screen display, a keyboard or other data entry device, or in some other manner. In the exemplary GUI 300, the user may exercise control by activating (for example, using a pointing device and/or touch screen) one or more of a plurality of virtual "buttons" presented within the GUI. Alternative GUIs may incorporate other techniques for user control, such as check boxes, lists, and/or pull-down menus presented within the GUI, or by entering selections via a keyboard or other data entry device. Additionally, the names assigned to the virtual buttons, entry windows, and other elements of the GUI 300 are exemplary and numerous other names could be assigned to the same or similar control and data entry functions.

The exemplary VAM shown in FIG. 3 is coupon 306 for a predetermined free food item including a variable content window 310 for defining an expiration date of the coupon. The content creation process 210 may be understood through reference to FIG. 2 and FIG. 3, wherein references designators from 200 to 240 refer to elements of FIG. 2 and reference designators from 300 to 334 refer to elements of FIG. 3.

At 212, a digitized image of the graphic content of the VAM at 212 may be provided to the content creation software tool. The digitized image may be provided by retrieving a digital image file from a storage device within or coupled to the computing device. The digital image file may be retrieved in response to the user entering a file name in a window 302 provided in the GUI 300. A conventional "browse" function, activated by a browse button 304 may be provided to assist the user in locating the digital image file. The graphical image may be displayed in a window 306 on the GUI when the digitized image is provided at 212. Information relating to the retrieved graphical image, such as the image size, may also be displayed at 312.

The retrieved digital image file may have been previously created and stored on the computing device by the user operating a graphic arts software tool. The retrieved digital image file may have been previously uploaded and stored on the computing device via a network or other communications link, or may have been previously uploaded from a portable memory device such as a flash drive. If the desired digital image file is not stored on a storage device within or coupled to the computing device, the content creation software tool may assist the user in retrieving the desired file via a network (not shown in FIG. 3).

The digitized image provided at 212 may be in the form of a compressed image data file, such as a JPG (Joint Photographic Experts Group) file, an EXF (exchangeable image file) file, a TIF (tagged image file) file, a PNG (portable network graphics) file, or a GIF (graphic interchange format) file. The digitized image may be in the form of an uncompressed image data file, such as a BMP (bitmap) file.

At 214, one or more windows for dynamic information may be defined within the graphical image provided at 212. For example, the GUI 300 may provide a "dynamic content" button 308 that the user may select to indicate that the VAM being created will include dynamic content. In response to activation of the dynamic content button 308, a user-controllable rectangle 310 may be overlaid on the displayed graphical image 306. The position and size of the rectangle 310 may be controlled by the user to define a dynamic content window within the graphical image. The position and size of the rectangle 310 may be controlled, for example, by the user dragging the sides or corners of the rectangle using a mouse or other pointing device. When the user is satisfied with the position and size of the dynamic content window defined by the rectangle 310, the user may activate a "set window" button 314 to freeze the size and position of the dynamic content window. Information relating to the dynamic content window, such as the size and text capacity of the window, may be displayed at 316 during and after the size and position of the dynamic content window are defined. The window size may be expressed in inches, as shown in FIG. 3, in picture elements, or in some other manner.

After the size and position of a dynamic content window are defined at 214, the content to be inserted into the window may be defined at 216. The content to be inserted may be a graphical image or text. When the content to be inserted is a graphical image, the user may enter a name of a graphical image data file into a window (not shown in FIG. 3) similar to the window 302. A browse button (not shown in FIG. 3) similar to the browse button 304 may be provide to assist the user in locating the desired image data file. In some situations, a user may enter a plurality of image data file names along with criteria for the POS terminal to dynamically select one image from the plurality of images at the time a receipt is printed. For example, a VAM may be coupon including a graphical image of a free food item selected, at the time of purchase, from the items purchased (or not purchased) by a customer.

When the content to be inserted in a dynamic content window is text, the user may enter the content using a keyboard or other data entry device. The entered content may appear in a window 318 within the GUI 300. The entered content may include fixed text and variable-content fields. The entered content may be a single line or may be multiple lines and may be formatted as allowed by the printer, including the ability to set bold, italic, underline, set line justification, and font size or typeface. A dynamic content window within a VAM may contain one or more variable content fields. In the example of FIG. 3, "Valid until" may be fixed text and <date> may be a variable content field. The variable content field <date> may be one of a predetermined plurality of variable content fields recognized by the content creation software tool. For example, the <date> field may have been selected using a pull-down menu 320 of possible variable content fields and an "Enter Field" button 322. In addition to <date>, the plurality of variable content fields listed in the pull-down menu may include some or all of <time>, <month>, <year>, <item>, <location>, <register number>, <receipt number>, <employee>, and other variable content fields. In some circumstances, such as a POS system that only prints coupon VAMs, <date> may be the only variable content field. In this case, the GUI 300 may not include the pull down menu 320.

When a variable content field is selected using the "Enter Field" button 322, additional windows 330 may appear in the GUI to allow the user to enter additional information relating to the variable content field. In the example of FIG. 3, the user may define a duration or expiration date for the coupon by entering a numeric value in the window 332 and selecting a unit from the pull-down menu 334. As shown in FIG. 3, the coupon is valid for up to 72 hours after the date of the receipt. Although not shown in FIG. 3, the GUI 300 may present additional options for a <date>field, including how a calculated future date may be rounded (i.e. to the nearest day) and/or how the date may appear within the VAM (i.e. "2/19/2010" or "Feb. 19, 2010").

Similar additional windows may be provided, where necessary, to allow a user to enter information relating to other variable content fields. Some variable content fields may not require any additional information to be entered during the content creation process. For example, the content of fields such as <location>, <register number>, <receipt number>, and <employee> may be extracted from receipt information generated by a POS terminal and thus may not require a user to enter additional information during the content creation process.

When the content of a first dynamic content window has been defined at 216, the user may optionally elect to return to 214, as indicated by the dashed arrow 215, to define another dynamic content window. For example, after the dynamic content for a first window has been defined, the user may select an "Add Window" button 338 to indicate that another dynamic content window is required. The size, location, and content of the new dynamic content window may then be defined as previously described. Alternatively, the user may define the size and location of two or more dynamic content widows at 214 and then sequentially define the content of each window at 216.

When all dynamic content windows have been defined, the content creation application may generate and save VAM data in the form of one or more data files containing all information necessary for a POS terminal to print the VAM. For example, the user may cause the VAM data to be saved by selecting a "Save" button 340 on the GUI 300. The GUI 300 may also provide the user with an option (for example, "Cancel" button 342) to terminate the content creation process without saving the VAM data. As will be discussed subsequently, the VAM data may be stored in a plurality of image data files and a file or date structure defining the content to be printing within each dynamic content window. VAM data generated by the content creation process 210 may be transferred to at least one POS system as indicated by the dashed arrow 220. VAM data may be transferred from the computing device running the content creation application to the POS system via a network or other communications link. VAM data may be recorded on a portable storage media, such as a flash drive, at the computing device running the content creation application and then may be physically carried to the POS system for upload. When the computing device running the content creation application is a portion of the POS system, VAM data may be simply stored on a storage device accessible to a transaction processing application running in the POS system. VAM content transferred or uploaded to a POS system may be stored within a POS terminal, within a POS printer, or distributed between a POS terminal and a POS printer.

The transaction process 230 may be performed each time a sale or other transaction is completed using the POS system. At 232, transaction data may be entered into the POS system. Transaction data may include, for example, the identification and quantity of items ordered or purchased. The transaction data may be entered by a customer service representative manually or with the assistance of a laser scanner or other automatic entry device. Transaction data may also include data identifying the customer, which may be provided by the customer or may be, for example, extracted from the customer's loyalty card, membership card, or credit card.

At 234, after all transaction data has been entered at 232, the POS system may generate receipt data which may include some or all of the transaction data entered at 232. In addition to the transaction data, the receipt data may include some or all of the identification and location of the merchant, the date and time of the transaction, the total amount paid, the method of payment, and other information.

At 236, one or more VAMs may be automatically selected for printing on the receipt to be given to the customer. In this description, the term "automatically" means "without operator involvement". The one or more VAMs may be automatically selected based, at least in part, on receipt data such as the items purchased, customer identity, location, date and/or time, method of payment, and other information accessible to the POS system. The one or more VAMs may be automatically selected based on receipt data and other information. The one or more VAMs may be selected based on customer loyalty data, which the POS system may retrieve from internal memory or from a remote server (not shown in FIG. 2). The one or more VAMs may be automatically selected independently of the receipt data. For example, VAMs may be selected in cyclic order or randomly. In some cases, VAMs may be selected by default. For example, the number of available VAMs may be low enough to allow all VAMs to be printed on every receipt. At least one VAM selected at 236 may have dynamic content.

When the receipt will be printed on a printer capable of two-sided printing, different VAMs may be selected for both sides of the receipt. For example, the receipt data from 234 may be printed on the front side of a receipt, and VAMs may be printed on both the front side (i.e. before or after the receipt data) and the back side of the receipt. The total number of VAMs selected may be based, in part, on the length of the printed receipt data, which may define the total available length for printing VAMs on the reverse side of the receipt.

Dynamic content for at least one VAM selected at 236 may be generated based on stored VAM data. The dynamic content, as defined during the content creation process 210, may include variable content fields which are filled or populated based, at least in part, on receipt data such as the date and/or time of purchase, items purchased, store location, register number, employee number of a sales associate, receipt number, customer loyalty information, method of payment, and other information accessible to the POS system.

At 240, a receipt may be printed. The printed receipt may include the receipt data from 234 and the one or more VAMs selected at 236 including dynamic content generated at 238.

POS printers typically print on one or both sides of rolled paper of various widths. The most common paper widths are 2.25" (58 mm) and 3.125" (80 mm), but other widths may also be used. POS printers commonly use thermal printing on special paper, but other printing techniques including impact, laser, and ink-jet may also be used.

POS printers commonly receive print data from a POS terminal via a data communications link. The communications link may be, for example, a serial link conforming to a standard such as RS232C, RS485, or USB (universal serial bus); a parallel link conforming to a standard such as IEEE 1284; a wireless link conforming to a standard such as IEEE 802.11; or an Ethernet link such as 10/100 Base TX. The data communicated from a POS terminal to a POS printer may include text strings which are converted into character dot patterns within the POS printer. The data communicated from a POS terminal to a POS printer may also include graphical images. Graphical images may be transmitted from the POS terminal to the POS printer on a line-by-line basis. Since a relatively long time may be required to transmit graphical images from a POS terminal to a POS printer via the serial communications link, POS printers may include memory for storing graphical images within the printer.

Figure 4:
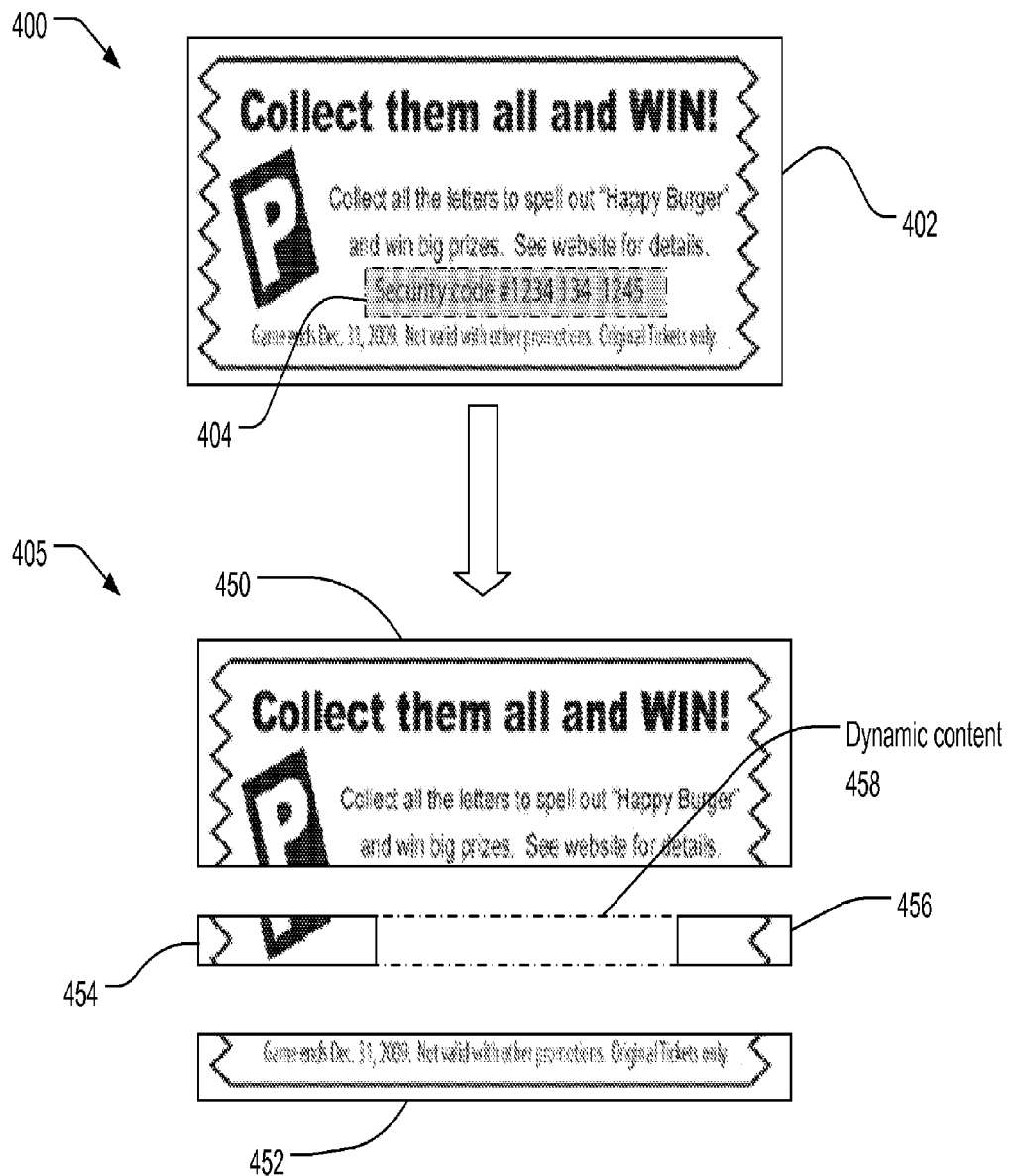
FIG. 4 is a graphical representation of VAM data files.

To facilitate printing VAMs with dynamic content, the VAM data generated at 218 may consist of a plurality of data files, as represented in FIG. 4. A VAM 400 may include a graphical image 402 and a dynamic content window outlined by the dash-dot rectangle 404. The VAM data 405 generated at 218 during the content creation process 210 may include a top image data file containing a top portion 450 of the graphical image above the dynamic content window and a bottom image data file contain a bottom portion 452 of the graphical image below the dynamic content window. The VAM data generated at 218 may also include a left image data file containing a left portion 454 of the graphical image to the left of the dynamic content window and a right image data file contain a right portion 456 of the graphical image to the right of the dynamic content window. The top, bottom, left, and right image data files 450/452/454/456 may be automatically generated, for example, by cropping the original graphical image 402 using a conventional image processing software tool. The edges of the dynamic content window (as indicated by the rectangle 404) may be used to determine the lines along which the original graphical image is cropped. The VAM data may also include a file or data structure with information relating to the dynamic content 458 to be printed within the dynamic content window. In this context, the terms "top", "bottom", "left" and "right" refer to the orientation of the VAM as it is printed, with the "top" portion printed first and the "bottom" portion printed last. In the example of FIG. 4, the orientation during printing is assumed to be consistent with the orientation in which the VAM will be read.

The VAM data generated at 218 may not include all of the top, bottom, left, and right image data files. For example, the VAM data for a VAM where the dynamic content window extends to or beyond the lower edge of a graphical image may not include a bottom image data file. Similarly, the VAM data for a VAM where the dynamic content window extends to or beyond the left edge of a graphical image may not include a left image data file. The VAM data for a VAM where the dynamic content window is positioned at a corner of the graphical image may only include two image data files (top or bottom and left or right).

Figures 5A, 5B:
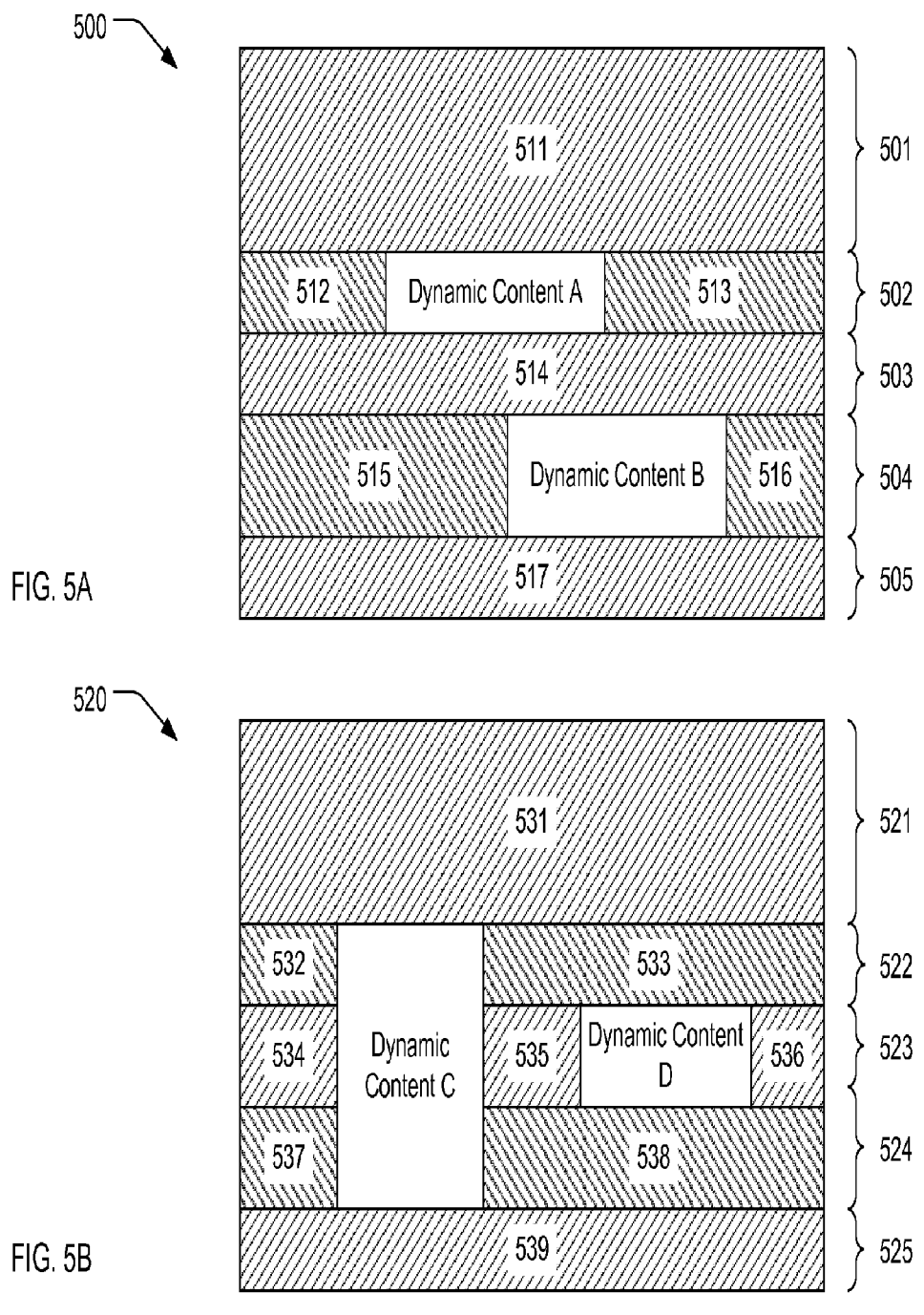
FIG. 5A is a graphical representation of VAM data files.
FIG. 5B is a graphical representation of VAM data files.

Referring now to FIG. 5A, a VAM 500 may include two dynamic content windows, identified as "Dynamic Content A" and "Dynamic Content B", embedded within a graphic image indicated by cross-hatched areas. The VAM 500 may be divided into five horizontal (as shown in FIG. 5A) bands 501, 502, 503, 504, 505. The number of horizontal bands may depend on the number and location of dynamic content windows. For example, the VAM of FIG. 4 may be divided into three bands.

In the example of FIG. 5A, horizontal bands 501, 503, and 505 include only portions 511, 514, and 517, respectively, of the graphical image. Horizontal band 502 includes the window for dynamic content A and left and right adjacent portions of the graphical image 512 and 513. Similarly, horizontal band 505 includes the window for dynamic content B and left and right adjacent portions of the graphical image 515 and 516. The content of portions 511-517 of the graphical image may be stored in respective image data files.

Referring now to FIG. 5B, another VAM 520 may also include two dynamic content windows, identified as "Dynamic Content C" and "Dynamic Content D", embedded within a graphic image indicated by cross-hatched areas.

The VAM 520 may also be divided into five horizontal (as shown in FIG. 5A) bands 521, 522, 523, 524, 525. In this example, horizontal bands 521 and 525 include only portions 531 and 539, respectively, of the graphical image. Horizontal band 522 includes part of the window for dynamic content C and left and right adjacent portions of the graphical image 532 and 533. Similarly, horizontal band 524 includes part of the window for dynamic content C and left and right adjacent portions of the graphical image 537 and 538. Horizontal band 523 includes part of the window for dynamic content C, all of the window for dynamic content D, and left, center, and right adjacent portions of the graphical image 534, 535, and 536. The content of portions 531-539 of the graphical image may be stored in respective image data files.

Figure 6:
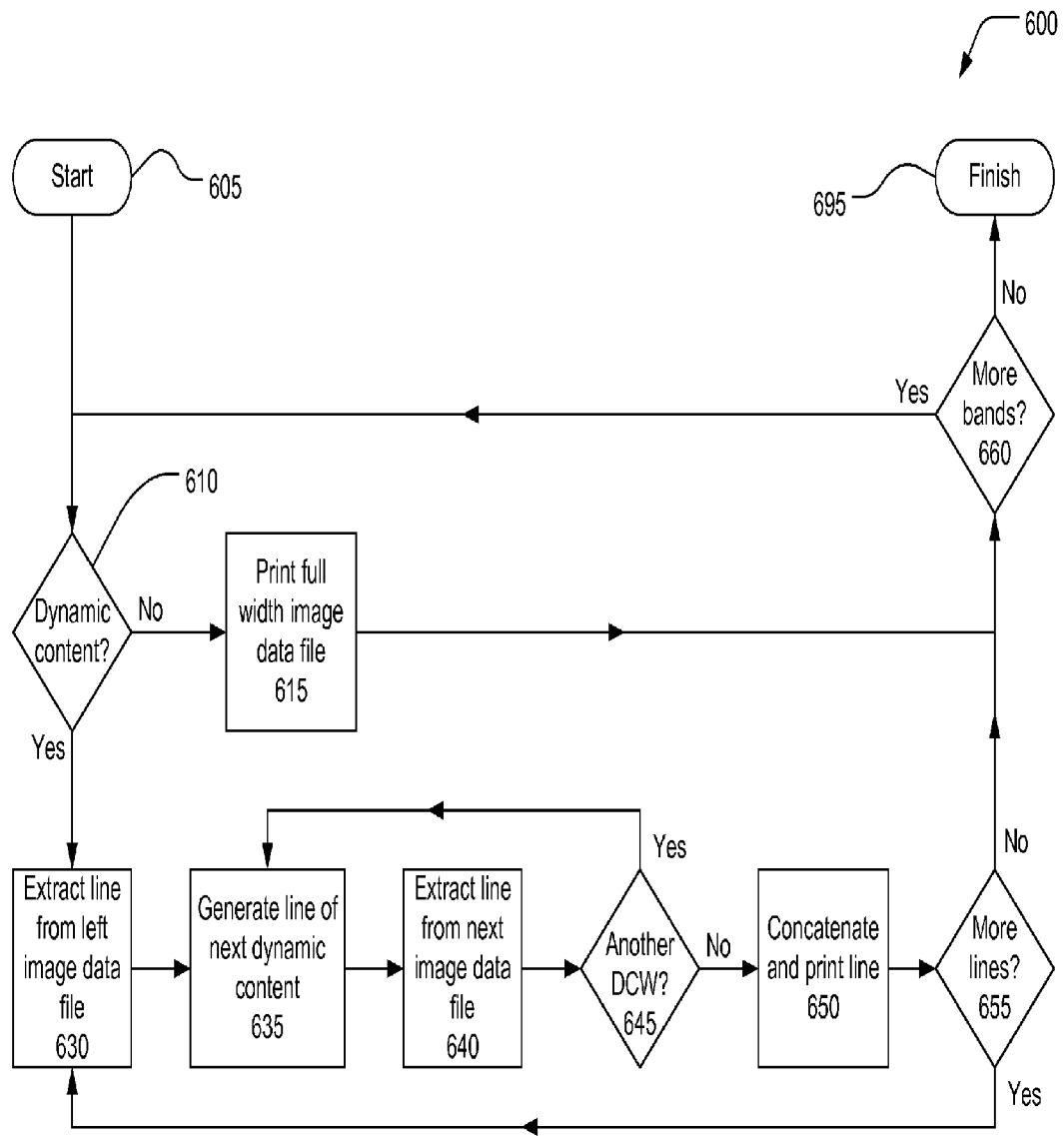
FIG. 6 is a flow chart of a process for printing a graphical VAM with dynamic content.

Referring now to FIG. 6, an exemplary process 600 for printing VAM data may be suitable for use at 240 in the process 200. The process 600 prints a single VAM, and may be repeated as necessary to print multiple VAMs on a receipt. Although not shown in FIG. 6, the process 600 may be performed before, after, or concurrently (in the case of two-sided printing) with a conventional process for printing receipt data. The process 600 assumes that the VAM may be divided into a plurality of horizontal bands as shown in FIG. 5A and FIG. 5B.

The process 600 may start at 605 when VAM data is available for printing, and may end at 695 after the VAM is printed. The process 600 may be cyclic in nature, and the actions from 610 to 660 may be repeated for each horizontal band within a VAM.

From the start at 605, the process 600 may proceed to 610 where a determination may be made whether or not the first horizontal band of the VAM contains dynamic content. If a determination is made at 610 that the first horizontal band does not contain a dynamic content window, a full-width portion of the VAM may be printed from an image data file. For example, the full-width image data file may be retrieved from a memory and converted to print data sent line-by-line to a POS printer. Alternatively, to minimize the time required to print a receipt, the full-width image data file may be stored in memory within the POS printer and printed in response to a command sent from a POS terminal to the POS printer. The full-width portion of the VAM may be, for example, the portion 450 in FIG. 4, the portion 511 in FIG. 5A, or the portion 531 in FIG. 5B.

After the full-width image band is printed at 615, a determination is made at 660 whether or not the VAM contains additional horizontal bands. When a determination is made at 660 that there are no more horizontal bands to be printed, the process 600 may finish at 695. For example, in the case of a graphical image VAM with no dynamic content, the VAM may be considered a single horizontal band. In that case, the entire graphical image VAM may be printed at 615 from a single image date file and the process may subsequently finish at 695. When a determination is made at 660 that there are one or more horizontal bands still to be printed, the process 600 may return to 610 to print the next horizontal band.

When a determination is made at 610 that a horizontal band contains one or more dynamic content windows, the horizontal band including the dynamic content and adjacent graphic image portions may be printed line-by-line from 630 to 655. Specifically, from 630 to 645, print data for a next print line of the band may be prepared by extracting corresponding lines from one or more image data files and generating the corresponding lines of one or more dynamic content windows. At 630, a corresponding line may be extracted from a left image data file. At 635, a corresponding line of a first (in order from left to right) dynamic content window may be generated. At 640, a corresponding line may be extracted from a next image data file that contains content for a graphical image portion to the right of the first dynamic content window. At 645 a determination may be made if the current horizontal band contains another dynamic content window (DCW).

When a determination is made at 645 that the current horizontal band contains another dynamic content window, the process may return to 635 to generate a corresponding line of a next dynamic content window. A corresponding line of a next graphic image portion (a portion to the right of the next dynamic image window) may be extracted at 640. The actions from 645 to 635 may be repeated as required until the corresponding lines of all portions of the current horizontal band have been extracted or generated.

When a determination is made at 645 than the current horizontal band does not contain another dynamic content widow, the process 600 may proceed to 650. At 650, the corresponding lines from the one or more image data files and the corresponding line of the one or more dynamic content windows may be concatenated to form a complete line of print data for the next print line. The complete line of print data may be sent to the POS printer for printing. The complete line of print data may be sent to the POS printer before the printing of the previous line or portion of the image is completed. The complete line of print data may be printed proximate to a previously printed line. In this context, the term "proximate" has the usual meaning of "immediately adjoining".

At 655, a determination may be made that additional lines within the current horizontal band must be printed. In this case, the actions from 630-650 may be repeated for a succession of print lines until the entire current horizontal band has been printed.

For example, consider the horizontal band 523 in FIG. 5B. On the first cycle through the actions from 630 to 655, a first line of image portion 534 may be extracted at 630, a corresponding line of dynamic content C may be generated at 635, and a corresponding line of image portion 535 may be extracted at 640. Subsequently, a determination made at 645 may be "yes" and the process may return to 635 to generate a first line of dynamic Content D. A first line of image portion 536 may be extracted at 640 and a subsequent determination at 645 may be "no". The extracted/generated content may be concatenated to form a full-width line of print data for printing at 650. The actions from 655 top 630 may then be repeated until all lines of the horizontal band 523 had been printed.

When a determination is made at 655 that the current horizontal band has been printed, the process 600 may proceed to 660, where a determination may be made whether or not the VAM contains additional horizontal bands. When a determination is made at 660 that there are no more horizontal bands to be printed, the process 600 may finish at 695. When a determination is made at 660 that there are one or more horizontal bands to be printed, the process 600 may return to 610 to print the next horizontal band.

FIG. 6 and the associated description of the process 600 were based on an assumption that the content of dynamic content windows is generated on a line-by-line basis. Alternatively, the content of the dynamic content windows may be generated and stored in respective image data files. In this case, dynamic content may be extracted from the previously generated image data files at 635.

Figure 7:
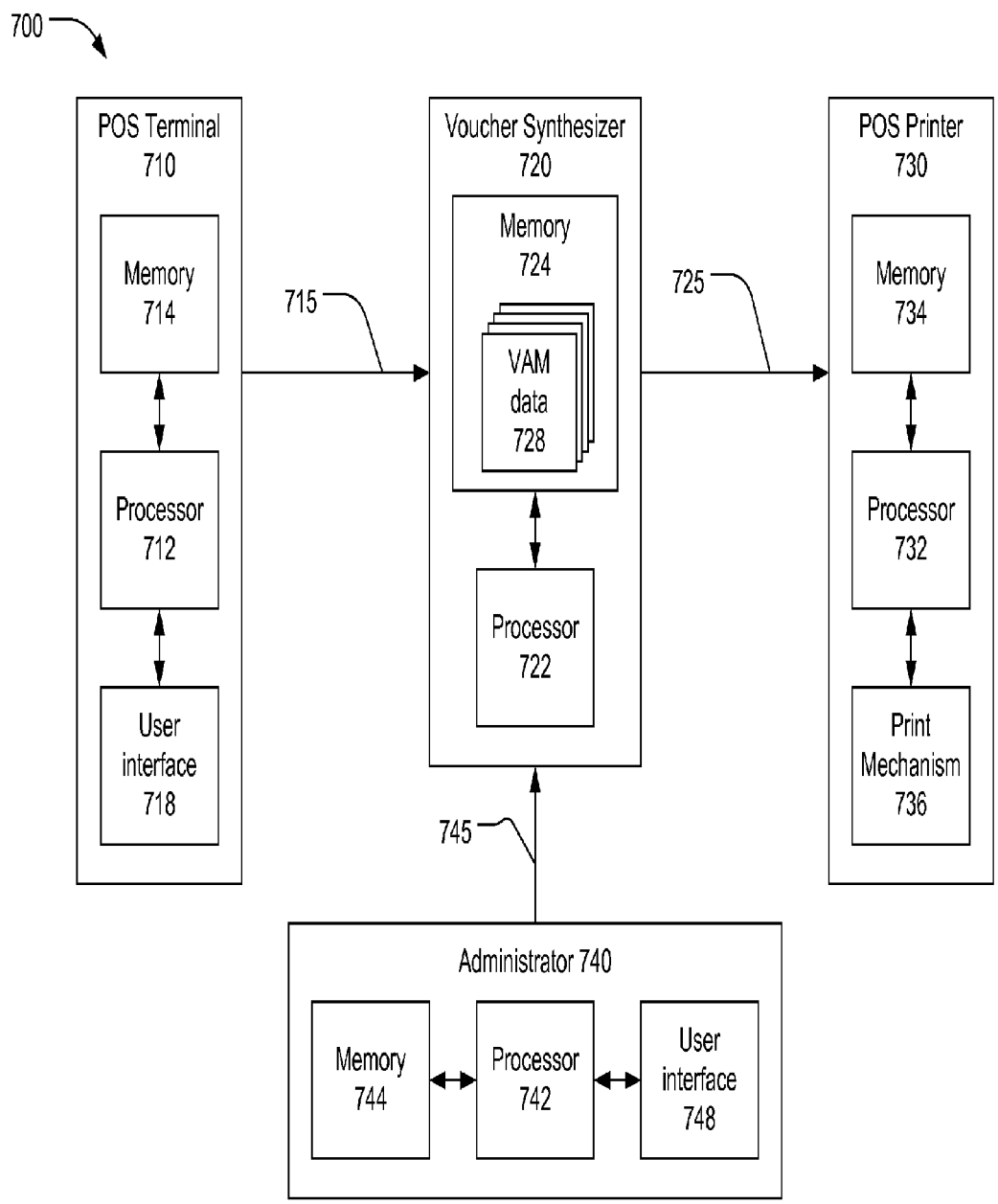
FIG. 7 is a block diagram of a system for printing graphical VAMs with dynamic content.

Referring now to FIG. 7, a POS system 700 may consist functionally of a POS terminal (or electronic cash register) 710, a voucher synthesizer 720, a POS printer 730, and an administrator computing device 740. Each of the POS terminal 710, the voucher synthesizer 720, the POS printer 730, and the administrator 740 may include specialized units, circuits, processors, software, and interfaces for providing functionality and features described herein.

The POS terminal 710, the voucher synthesizer 720, the POS printer 730, and the administrator 740 may each include a respective processor 712, 722, 732, 742. Each processor 712, 722, 732, 742 may include one or more of logic arrays, analog circuits, digital circuits, firmware, microprocessors, field programmable gate arrays (FPGAs), application specific integrated circuits (ASICs), programmable logic devices (PLDs) and programmable logic arrays (PLAs). Each processor 712, 722, 732, 742 may execute software which may be in the form of firmware, an application program, an applet (e.g., a Java applet), a browser plug-in, a COM object, a dynamic linked library (DLL), a script, one or more subroutines, or an operating system component or service.

The POS terminal 710, the voucher synthesizer 720, the POS printer 730, and the administrator 740 may each include a respective memory 714, 724, 734, 744. Each memory 714, 724, 734, 744 may include read-only memory and/or random access memory. Each memory 714, 724, 734, 744 may include a storage device. As used herein, a storage device is a device that allows for nonvolatile reading and/or writing to a storage medium. Storage devices include hard disk drives, CD drives, DVD drives, flash memory devices, and others. Each storage device may include removable or non-removable storage media. These storage media include, for example, magnetic media such as hard disks, floppy disks and tape; optical media such as compact disks (CD-ROM and CD-RW) and digital versatile disks (DVD and DVD.+-.RW); flash memory cards; and other computer-readable non-transitory storage media.

The partitioning of the POS system 700 into POS terminal, receipt synthesizer, POS printer, and administrator functional units for ease of discussion does not imply a corresponding physical division or structure. For example, the POS terminal 710 and the POS printer 730 may be, in some systems, housed within a common physical unit. In some systems, the functions of the POS terminal 710 and the voucher synthesizer 720 may be performed by common hardware located within a single physical unit (for example, the processor 712 and the processor 722 may be or share common circuit components). Similarly, in some systems, the functions of the POS terminal 710 and the administrator 740 may be performed by common hardware located within a single physical unit. The functions of the voucher synthesizer 720 may be distributed between a first physical unit that houses the POS terminal 710 and a second physical unit that houses the POS printer 730. In some systems, the POS terminal 710, the voucher synthesizer 720, the POS printer 730, and the administrator 740 may be independent physical units.

In addition to the processor 712 and the memory 714, the POS terminal 710 may include a user interface 718. The user interface may include a keypad or keyboard, a display which may include a touch-screen, a bar code scanner, and/or other elements that allow a customer service representative or other operator to enter transaction data relating to a business transaction. After the transaction data has been entered, the operator may instruct the POS terminal 710 to cause a receipt documenting the transaction to be printed. In response, the POS terminal 710 may prepare receipt data including some or all of the entered transaction data and additional information.

The receipt data may be transferred from the POS terminal 710 to the voucher synthesizer 720 via first data path 715. When the POS terminal 710 and the voucher synthesizer 720 share common hardware, the first data path 715 may be, for example, an interface between software modules. When the POS terminal 710 and the voucher synthesizer 720 are separate units, the first data path may be a wired, wireless, or optical communications link. The first data path 715 may be a network connection, a serial or parallel data bus, or some other communications link.

Before, while, or after the POS terminal 710 prepares receipt data, the voucher synthesizer 720 may automatically select one or more VAMs to be printed on the receipt. The one or more VAMs may be automatically selected based, at least in part, on receipt data such as the items purchased, customer identity, location, date and/or time, method of payment, and other information accessible to the POS system. The one or more VAMs may be automatically selected based on receipt data and other information. The one or more VAMs may be automatically selected independently of the receipt data. For example, VAMs may be selected in cyclic order or randomly. In some cases, VAMs may be selected by default. For example, the number of available VAMs may be low enough to allow all VAMs to be printed on every receipt. At least one VAM selected at 236 may have dynamic content.

The voucher synthesizer 720 may generate dynamic content for at least one VAM selected at 236 based on stored VAM data 728. The dynamic content, as defined during the content creation process 210, may include variable content fields which are filled or populated based, at least in part, on receipt data and other information received from the POS terminal 710.

The voucher synthesizer 720 may then combine the receipt data and the VAM data including the generated dynamic content to provide print data for the POS printer 730. The print data may be transferred from the voucher synthesizer 720 to the POS printer 730 via a second data path 725. The second data path 725 may be, for example, a wireless communications link, a parallel printer interface, or a serial communications link which may conform to a specification such as RS232C, RS485, USB, IEEE 802.11, IEEE 1284, or Ethernet 10/100 Base TX.

In addition to the processor 732 and the memory 734, the POS printer may include a print mechanism 736 to print the print data received from the receipt synthesizer 720 onto paper or another medium. The print mechanism 736 may be a thermal print mechanism. The print mechanism 736 may be an ink-jet, laser, impact, or other type of print mechanism.

The POS system 700 may include hardware and software to perform a transaction process, such as the transaction 230, which prints VAMs including dynamic content. Software instructions, which may be executed to cause the POS system 700 to perform the transaction process, may be stored on a computer-readable storage media within or coupled to the POS terminal 710, the voucher synthesizer 720, and/or the POS printer 730.

In addition to the processor 742 and the memory 744, the administrator 740 may contain a user interface 748. The user interface may include, for example, a display device, a data entry device such as a keyboard, and a pointing device such as a mouse. The administrator 740 may include hardware and software to perform a content creation process, such as the content creation process 210, which generates VAM data defining VAMs including dynamic content. Software instructions, which may be executed to cause the administrator 740 to perform the content creation process, may be stored on a computer-readable storage media within or coupled to the administrator 740.

VAM data created by the administrator 740 may be transferred to the voucher synthesizer 720 over a third data path 745. When the administrator 740 and the receipt synthesizer 720 share common hardware, the third data path 745 may be, for example, an interface between software modules. When the administrator 740 and the voucher synthesizer 720 are separate units, the first data path may be a wired, wireless, or optical communications link. The third data path 745 may be a network connection, a serial or parallel data bus, or some other communications link. The third data path 745 may include storing the VAM data on a removal storage media at the administrator 740, physically transporting the removal storage media to the voucher synthesizer 720, and uploading the VAM data from the removable storage media to the voucher synthesizer 720.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A method for printing dynamic content on a receipt, the method comprising:
  receiving at a voucher synthesizer transaction data entered at a point-of-sale terminal for a transaction, the transaction data comprising an identification of items purchased or ordered, the voucher synthesizer comprising a processor and a memory coupled to the processor;
  receiving at the processor receipt data from the point-of-sale terminal, wherein the receipt data comprises identification of the merchant, date and time of the transaction, and the total amount paid;
  selecting at the processor at least one value adding message, the value adding message comprising a graphical image, the value adding message selected based on receipt data, customer loyalty data, cyclic order or randomly, wherein the graphical image is a digital image from a compressed image data file comprising one of Joint Photographic Experts Group file, an exchangeable image file, a tagged image file, a portable network graphics file, or a graphic interchange format file;
  generating at the processor dynamic content for the value adding message based on transaction data at the point-of-sale terminal, wherein the dynamic content is one of a date derived from a transaction date included in the receipt data, an item description included in the receipt data, a store location, a register number, an employee identifier, or a receipt number associated with the transaction;
  generating at the processor print data to cause a point-of-sale printer to print a receipt, the receipt including the receipt data, the graphical image, and the dynamic content, wherein the print data instructs the point-of-sale printer to print the receipt data first, then print the graphical image with a window embedded therein, and then print the dynamic content within the window with the dynamic content window touching the graphical image;
  transferring the print data from the voucher synthesizer to the point-of-sale printer; and
  printing at the point-of-sale printer the receipt in a plurality of horizontal bands until a final horizontal band of the plurality of horizontal bands is printed.

2. A method for printing dynamic content on a receipt, the method comprising:
  receiving at a voucher synthesizer transaction data entered at a point-of-sale terminal for a transaction, the transaction data comprising an identification of items purchased or ordered, the voucher synthesizer comprising a processor and a memory coupled to the processor;
  receiving at the processor receipt data from the point-of-sale terminal, wherein the receipt data comprises identification of the merchant, date and time of the transaction, and the total amount paid;
  selecting at the processor at least one value adding message, the value adding message comprising a graphical image, wherein the graphical image is a digital image from a compressed image data file comprising one of Joint Photographic Experts Group file, an exchangeable image file, a tagged image file, a portable network graphics file, or a graphic interchange format file;
  generating at the processor dynamic content for the value adding message based on transaction data at the point-of-sale terminal, wherein the dynamic content is one of a date derived from a transaction date included in the receipt data, an item description included in the receipt data, a store location, a register number, an employee identifier, or a receipt number associated with the transaction;
  transferring print data for a receipt from the voucher synthesizer to a point-of-sale printer, the print data including the receipt data, the graphical image, and the dynamic content, wherein the print data instructs the point-of-sale printer to print the graphical image with a window embedded therein, and then print the dynamic content within the window with the dynamic content window touching the graphical image; and
  printing at the point-of-sale printer the receipt.

* * * * *